United States Patent
Choi et al.

(10) Patent No.: US 12,034,165 B2
(45) Date of Patent: Jul. 9, 2024

(54) NEGATIVE ELECTRODE ACTIVE MATERIAL, NEGATIVE ELECTRODE INCLUDING NEGATIVE ELECTRODE ACTIVE MATERIAL, AND SECONDARY BATTERY INCLUDING NEGATIVE ELECTRODE

(71) Applicant: LG CHEM, LTD., Seoul (KR)

(72) Inventors: Jung Hyun Choi, Daejeon (KR); Yong Ju Lee, Daejeon (KR); Eun Kyung Kim, Daejeon (KR); Rae Hwan Jo, Daejeon (KR); Dong Hyuk Kim, Daejeon (KR); Il Geun Oh, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 163 days.

(21) Appl. No.: 16/696,672

(22) Filed: Nov. 26, 2019

(65) Prior Publication Data

US 2020/0099052 A1 Mar. 26, 2020

Related U.S. Application Data

(63) Continuation of application No. PCT/KR2018/001011, filed on Jan. 23, 2018.

(30) Foreign Application Priority Data

Jun. 2, 2017 (KR) .................. 10-2017-0068981

(51) Int. Cl.
| | |
|---|---|
| *H01M 4/587* | (2010.01) |
| *H01M 4/36* | (2006.01) |
| *H01M 4/485* | (2010.01) |
| *H01M 4/62* | (2006.01) |
| *H01M 10/0525* | (2010.01) |

(52) U.S. Cl.
CPC ........... *H01M 4/587* (2013.01); *H01M 4/366* (2013.01); *H01M 4/485* (2013.01); *H01M 4/623* (2013.01); *H01M 10/0525* (2013.01)

(58) Field of Classification Search
None
See application file for complete search history.

(56) References Cited

U.S. PATENT DOCUMENTS

| | | | |
|---|---|---|---|
| 2004/0234858 A1 | 11/2004 | Torimae et al. | |
| 2009/0075173 A1* | 3/2009 | Jeong ................... | H01M 4/134 429/218.1 |
| 2011/0097629 A1 | 4/2011 | Yew et al. | |
| 2013/0004846 A1 | 1/2013 | Kim et al. | |
| 2014/0106230 A1* | 4/2014 | Kim ...................... | H01M 4/386 429/231.9 |
| 2014/0205905 A1 | 7/2014 | Xiao et al. | |
| 2015/0064552 A1 | 3/2015 | Huang et al. | |
| 2016/0190597 A1* | 6/2016 | Kim ...................... | H01M 4/625 429/218.1 |
| 2016/0233484 A1 | 8/2016 | Hirose et al. | |
| 2017/0069909 A1 | 3/2017 | Eom et al. | |

FOREIGN PATENT DOCUMENTS

| | | | |
|---|---|---|---|
| CN | 103456928 A | | 12/2013 |
| CN | 103943819 A | | 7/2014 |
| JP | 2004-335344 A | | 11/2004 |
| JP | 2008-149957 A | | 6/2005 |
| JP | 2005-220225 A | | 8/2005 |
| JP | 2015-156355 A | | 8/2015 |
| JP | 2016-66508 A | | 4/2016 |
| JP | 2016066508 A | * | 4/2016 |
| KR | 10-2011-0046076 A | | 5/2011 |
| KR | 10-2012-0139450 A | | 12/2012 |
| KR | 10-1342601 B1 | | 12/2013 |
| KR | 10-2015-0112746 A | | 10/2015 |
| KR | 10-2015-0113771 A | | 10/2015 |
| KR | 10-2016-0081688 A | | 7/2016 |
| KR | 10-2017-0028099 A | | 3/2017 |

OTHER PUBLICATIONS

Extended European Search Report, dated Mar. 16, 2020, for European Application No. 18810843.5.
International Search Report for PCT/KR2018/001011 (PCT/ISA/210) mailed on Apr. 25, 2018.

* cited by examiner

*Primary Examiner* — Zhongqing Wei
(74) *Attorney, Agent, or Firm* — Birch, Stewart, Kolasch & Birch, LLP

(57) ABSTRACT

A negative electrode active material including silicon-based active material particles each including a core including $SiO_x$, wherein $0 \leq x \leq 2$, and a coating layer present on the core. Also, a negative electrode active material in which the coating layer is any one of a carbon coating layer or a polymer coating layer, and the coating layer includes a fluorinated material including at least one of an alkali metal or an alkaline earth metal.

17 Claims, No Drawings

NEGATIVE ELECTRODE ACTIVE MATERIAL, NEGATIVE ELECTRODE INCLUDING NEGATIVE ELECTRODE ACTIVE MATERIAL, AND SECONDARY BATTERY INCLUDING NEGATIVE ELECTRODE

CROSS-REFERENCE TO RELATED APPLICATIONS

This application is a By-Pass Continuation of International Application PCT/KR2018/001011, filed on Jan. 23, 2018, which claims the benefits of Korean Patent Application No. 10-2017-0068981, filed on Jun. 2, 2017, in the Korean Intellectual Property Office, the entire contents of which are incorporated herein their entireties by reference.

TECHNICAL FIELD

The present invention relates to a negative electrode active material, a negative electrode including the negative electrode active material, and a secondary battery including the negative electrode, and specifically, the negative electrode active material includes silicon-based active material particles comprising a core comprising $SiO_x$, wherein $0 \leq x < 2$, and a coating layer present on the core, wherein the coating layer is a carbon coating layer or a polymer coating layer, and the coating layer includes a fluorinated material including at least one selected from the group consisting of an alkali metal and an alkaline earth metal.

BACKGROUND ART

Due to the rapid increase in the use of fossil fuels, the demand for the use of alternative energy or clean energy has been increasing. As a part of this, the most actively studied fields are the fields of power generation and power storage using electrochemical reactions.

At present, a typical example of an electrochemical device using such electrochemical energy includes a secondary battery, and the use area thereof is gradually increasing.

In recent years, as technology development and demand for mobile devices such as a mobile computer, a mobile phone, and a camera increase, the demand for secondary batteries as energy sources is rapidly increasing. Among such secondary batteries, a lithium secondary battery having high energy density, that is, high capacity has been studied a lot, and is also commercially available and widely used.

Generally, the secondary battery includes a positive electrode, a negative electrode, an electrolyte, and a separation membrane. The negative electrode includes a negative electrode active material for intercalating and deintercalating lithium ions discharged from the positive electrode. As the negative electrode active material, a silicon-based particle having a large discharge capacity may be used. However, the silicon-based particle such as $SiO_x$ ($0 \leq x < 2$) has low initial efficiency and the volume thereof is excessively changed in the process of charging/discharging. Therefore, there arises a problem that the service life of the battery is shortened.

Conventionally, in order to solve these problems, the technology of forming a coating layer on the surface of the silicon-based particle has been used. Specifically, a carbon coating layer on the surface of the silicon-based particle was formed (Korean Patent Laid-Open Publication No. 10-2015-0112746), or a polymer coating layer thereon was formed. However, when the polymer coating layer is formed, there arises a problem that the battery resistance increases. Further, even when the carbon coating layer is formed instead of the polymer coating layer, the effect of reducing the battery resistance is not large.

Therefore, there is a need for the development of a negative electrode active material in which the volume change may be effectively controlled in the process of charging/discharging, and the resistance of the negative electrode may be effectively decreased.

PRIOR ART DOCUMENT

Patent Document (Patent Document 1) Korean Patent Laid-Open Publication No. 10-2015-0112746.

DISCLOSURE OF THE INVENTION

Technical Problem

An aspect of the present invention provides a negative electrode active material capable of effectively controlling the volume change in the process of charging/discharging a secondary battery and effectively decreasing the resistance of a negative electrode.

Technical Solution

According to an embodiment of the present invention, there is provided a negative electrode active material including silicon-based active material particles comprising a core comprising $SiO_x$, wherein $0 \leq x < 2$, and a coating layer present on the core, wherein the coating layer is a carbon coating layer or a polymer coating layer, and the coating layer includes a fluorinated material including at least one of an alkali metal or an alkaline earth metal.

According to another embodiment of the present invention, there is provided a negative electrode including the negative electrode active material, and a secondary battery including the negative electrode.

Advantageous Effects

In the negative electrode active material according to an embodiment of the present invention, the coating layer of a silicon-based active material particle includes a fluorinated material including at least one of an alkali metal or an alkaline earth metal, so that the resistance of a negative electrode including the negative electrode active material may be effectively reduced. As a result, the charge/discharge characteristics of the battery may be improved.

BEST MODE FOR CARRYING OUT THE INVENTION

Hereinafter the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing exemplary embodiments only and is not intended to be limiting of the invention. The singular forms "a," "an," and "the" include plural referents unless the context clearly dictates otherwise.

It will be understood that the terms "includes", "provides", or "has", when used in this specification, specify the presence of stated features, integers, steps, operations, elements, and/or components, but do not preclude the presence or addition of one or more other features, integers, steps, operations, elements, components, and/or groups thereof.

A negative electrode active material according to an embodiment of the present invention includes silicon-based active material particles, each including a core including $SiO_x$, wherein $0 \leq x < 2$, and a coating layer present on the core. The coating layer may be a carbon coating layer or a polymer coating layer, and the coating layer may include a fluorinated material containing at least one of an alkali metal or an alkaline earth metal.

The core may include $SiO_x$ ($0 \leq x < 2$). The $SiO_x$ ($0 \leq x < 2$) may be in the form including Si and $SiO_2$. That is, the x corresponds to the number ratio of O to Si included in the $SiO_x$ ($0 \leq x < 2$). When the core includes $SiO_x$ ($0 \leq x < 2$), the discharge capacity of the secondary battery may be improved. More specifically, the $SiO_x$ may be SiO.

The $SiO_2$ may be a crystalline $SiO_2$. The crystalline $SiO_2$ may be quartz, cristobalite, or tridymite.

The average particle diameter ($D_{50}$) of single particles (e.g., primary particles that do not agglomerate into secondary particles, but where the primary particles themselves become the core of the negative electrode active material) of the core may be 0.1 μm to 50 μm, and specifically, may be 1 μm to 20 μm. When the average particle diameter range of 0.1 μm to 50 μm is satisfied, the side reaction with an electrolytic solution is suppressed, the oxidation of the core is controlled, and the initial efficiency may be prevented from being lowered, which is advantageous for the electrode production process. In the present specification, the average particle diameter ($D_{50}$) may be defined as a particle diameter on the basis of 50% particle diameter distribution. The average particle diameter ($D_{50}$) may be measured by using, for example, a laser diffraction method. The laser diffraction method may generally measure the particle diameter of about several millimeters from a submicron region, resulting in high reproducibility and high degradability.

The coating layer may be present on the core, and specifically, may cover at least a part of the core.

The coating layer may include a fluorinated material including at least one of an alkali metal or an alkaline earth metal. The alkali metal may be at least one selected from the group consisting of Li, Na and K, and the alkaline earth metal may be at least one selected from the group consisting of Mg, Be and Ca. More specifically, the fluorinated material may include at least one selected from the group consisting of LiF, NaF and $MgF_2$. The coating layer includes the fluorinated material including at least one of an alkali metal or an alkaline earth metal, so that the resistance of the battery including the silicon-based active material particle may be effectively reduced. Accordingly, the initial efficiency and service life of the battery may be improved.

The fluorinated material may be included in an amount of 0.1 wt % to 20 wt % based on a total weight of the coating layer, and specifically, may be included in an amount of 0.5 wt % to 10 wt % based on the total weight of the coating layer. When the above range of 0.1 wt % to 20 wt % is satisfied, the resistance of the battery may be more effectively reduced, and an SEI film may be stably formed. The above amount may be controlled in the process of producing the negative electrode active material.

At least a part of the fluorinated material may be spaced apart from the core. When forming a coating layer, the fluorinated material may be mixed with a coating layer-forming composition and disposed on the core, so that at least a part of the fluorinated material may be spaced apart from the core. Stated differently, at least a portion of the fluorinated material does not directly contact the core. In an embodiment, at least 20-60 wt %, 30-50 wt %, or 35-45 wt % (based upon the total weight of the fluorinated material) of the fluorinated material may be spaced apart from the core.

The polymer coating layer may be included in an amount of 0.1 wt % to 50 wt %, based on a total weight of the silicon-based active material particle, and specifically, may be included in an amount of 0.5 wt % to 20 wt %. When the above range of 0.1 wt % to 50 wt % is satisfied, the capacity and efficiency of the negative electrode active material may be prevented from decreasing, and the resistance of the negative electrode may be prevented from increasing. The coating layer may be a carbon coating layer or a polymer coating layer.

The carbon coating layer may be formed on the core, thereby being capable of imparting the conductivity to the silicon-based active material particle and improving the initial efficiency, life characteristics, and battery capacity characteristics of the secondary battery including a negative electrode active material containing the silicon-based active material particle.

The carbon coating layer may include at least one selected from the group consisting of an amorphous carbon and a crystalline carbon.

The crystalline carbon may further improve the conductivity of the silicon-based active material particle. The crystalline carbon may include at least one selected from the group consisting of fluorine, carbon nanotube and graphene.

The amorphous carbon may properly maintain the strength of the carbon coating layer to suppress the expansion of the core. The amorphous carbon may be a carbonazied material of at least one selected from the group of consisting of tar, pitch, and other organic materials, or may be a carbon-based material formed by using hydrocarbon as a source of a chemical vapor deposition method.

The carbonazied material of the other organic materials may be a carbonazied material of an organic material selected from the group consisting of sucrose, glucose, galactose, fructose, lactose, mannose, ribose, aldohexose or ketohexose and a combination thereof.

The hydrocarbon may be a substituted or unsubstituted aliphatic or alicyclic hydrocarbon, or a substituted or unsubstituted aromatic hydrocarbon. The aliphatic or alicyclic hydrocarbon of the substituted or unsubstituted aliphatic or alicyclic hydrocarbon may include methane, ethane, ethylene, acetylene, propane, butane, butene, pentane, isobutane, hexane, or the like. The aromatic hydrocarbon of the substituted or unsubstituted aromatic hydrocarbon may include benzene, toluene, xylene, styrene, ethylbenzene, diphenylmethane, naphthalene, phenol, cresol, nitrobenzene, chlorobenzene, indene, coumarone, pyridine, anthracene, phenanthrene, or the like.

The carbon coating layer may be included in an amount of 0.1 wt % to 50 wt %, based on a total weight of the silicon-based active material particle, and specifically, may be included in an amount of 0.5 wt % to 20 wt % based on the total weight of the silicon-based active material particle.

When the above range is satisfied, the capacity and efficiency of the negative electrode active material may be prevented from decreasing.

The thickness of the carbon coating layer may be 0.005 μm to 0.1 μm, and may be specifically 0.01 μm to 0.05 μm. When the above range of 0.005 μm to 0.1 μm is satisfied, the conductivity of the silicon-based active material particle is improved, thus being an effect that the initial efficiency and service life of the battery is improved.

The polymer coating layer may include at least one selected from the group consisting of polyaniline, polyacrylonitrile, poly(1-pyrenemethyl methacrylate) being a homopolymer of pyrene, poly(1-pyrenemethyl methacrylate-co-triethylene oxide methyl ether methacrylate) being a copolymer of pyrene, a polymer obtained by changing a pyrene side chain of the homopolymer or copolymer of the pyrene into anthracene, a polymer having polyparaphenylene, polyaniline, a carbonyl group and methylbenzoic ester, and polyacetylene having a conjugation bond. The polymer having a carbonyl group and methylbenzoic ester may be poly(9,9-dioctylfluorene-co-fluorenone-co-methylbenzoic ester) (PFFOMB). The polymer coating layer is formed on the core, so that the conductivity of the electrode may be increased, a conductive path may be prevented from being disconnected due to the expansion and shrinkage of the silicon-based active material particle, and the side reaction with the electrolytic solution may be reduced.

The polymer coating layer may be included in an amount of 0.1 wt % to 50 wt % based on a total weight of the silicon-based active material particle, and specifically, may be included in an amount of 0.5 wt % to 20 wt % based on the total weight of the silicon-based active material particle. When the above range of 0.1 wt % to 50 wt % is satisfied, the resistance of the negative electrode may be prevented from increasing.

The thickness of the polymer coating layer may be 0.005 μm to 0.1 μm, and may be specifically 0.01 μm to 0.05 μm. When the thickness of the polymer coating layer satisfies the above range of 0.005 μm to 0.1 μm, the conductive path may be easily obtained due to the polymer coating layer, and the side reaction with the electrolytic solution may be easily controlled.

The silicon-based active material particle of the present embodiment may be in the form of single particles. Specifically, the form of single particles means not that the primary particles agglomerate to form the form of secondary particles, but that the primary particles themselves become a negative electrode active material. In this case, the average particle diameter ($D_{50}$) of the primary particles, that is, silicon-based active material particles may be 0.1 μm to 50 μm, and may be specifically 1 μm to 20 μm. When the above range of 0.1 μm to 50 μm is satisfied, the reaction with the electrolytic solution is not excessive, and the electrode production is easy.

The negative electrode active material according to another embodiment of the present invention is the same as the negative electrode active material according to the above mentioned embodiment, but differs in that the core may further include a metal compound. The difference thereof will be described.

The metal compound may be included in the core. The metal compound may be formed by oxidizing the metal having a reduction power which may deoxidize the $SiO_x$ (0≤x<2), specifically, deoxidize the silicon dioxide ($SiO_2$) in the SiOx (0≤x<2) to silicon. The metal compound may include at least one selected from the group consisting of a metal compound and a metal silicate.

The metal oxide may include an oxide of at least one metal selected from the group consisting of Li, Mg, Al, Ca, and Ti. Specifically, the metal oxide may be at least one selected from the group consisting of MgO, $Li_2O$ and $Al_2O_3$.

The metal silicate may be a silicate of at least one or two metals selected from the group consisting of Li, Mg, Al, Ca and Ti. Specifically, the metal silicate may be at least one selected from the group consisting of $MgSiO_3$, $Mg_2SiO_4$, $Li_2SiO_3$, $Li_4SiO_4$, $Li_2Si_2O_5$, $Al_6SiO_{13}$ and $Al_4SiO_8$.

The metal compound may be formed of a metal doped in the core. The metal may be doped in the core, so that SiO and/or $SiO_2$ matrix may be deoxidized, and the metal compound may be formed. As a result, the amount of $SiO_2$ acting irreversibly at an initial stage may decrease, so that the initial efficiency of the battery may be improved.

The metal compound may be included in an amount of 1 wt % to 60 wt %, based on the total weight of the core, and may be specifically 2 wt % to 50 wt %. When the above range of 1 wt % to 60 wt % is satisfied, the initial efficiency of the battery may be further improved, and the size of a Si crystal in the core may be prevented from increasing excessively.

The negative electrode active material according to still another embodiment of the present invention is the same as the negative electrode active material according to the above-described embodiment. However, the silicon-based active material particle is not a single particle but a primary particle type, and differs from the single particle in that the silicon-based active material particles agglomerate with each other to form secondary particles. The difference therebetween will be described.

The silicon-based active material particles are in a primary particle type and agglomerate each other to a form secondary particle. Specifically, when the silicon-based active material particles agglomerate to form a secondary particle type, due to the space between the primary particles constituting the secondary particle, the volume expansion of the negative electrode active material in the outward direction may be effectively controlled during charge/discharge of the battery.

The average particle diameter ($D_{50}$) of the silicon-based active material particles constituting the secondary particle may be 0.5 μm to 20 μm, and may be specifically 0.5 μm to 5 μm. When the above range of 0.5 μm to 20 μm is satisfied, the charge/discharge C-rate characteristics may be improved, and a solid electrolyte interphase (SEI) layer may be stably formed.

The average particle diameter ($D_{50}$) of the secondary particle formed by agglomerating the silicon-based active material particles may be 1 μm to 70 μm, and may be specifically 3 μm to 40 μm. When the above range of 1 μm to 70 μm is satisfied, the volume expansion of the silicon-based active material particle may be further effectively controlled.

The porosity of the secondary particle may be 1% to 90%, and may be specifically 1% to 40%. When the above range is satisfied, the charge/discharge C-rate characteristics is further effectively improved.

A negative electrode active material according to still another embodiment of the present invention is the same as the negative electrode active material according to the above-described embodiment, but the silicon-based active material particles are not single particles but are in the form of primary particles and agglomerate each other to form secondary particles, which differs in that the core further includes a metal compound. The description on the form of the secondary particles and the metal compound is the same as described above.

A negative electrode active material according to still another embodiment of the present invention is similar to the negative electrode active material according to the above-described embodiment, except that the negative electrode active material particle may further include a carbon-based active material particle.

By using the carbon-based active material particle together with the silicon-based active material particle, the charge/discharge characteristics of the battery may be improved. The carbon-based active material particle may be at least one selected from the group consisting of artificial graphite, natural graphite, graphitized carbon fiber and graphitized mesocarbon microbeads.

A negative electrode according to still another embodiment of the present invention may include a negative electrode active material, wherein the negative electrode active material is the same as the negative electrode active material of the above-described embodiments. Specifically, the negative electrode may include a current collector and a negative electrode active material layer disposed on the current collector. The negative electrode active material layer may include a negative electrode active material. Further, the negative electrode active material layer may further include a binder and/or a conductive material.

The current collector is not particularly limited as long as having electrical conductivity without causing a chemical change in the battery. For example, the current collector may include copper, stainless steel, aluminum, nickel, titanium, sintered carbon, a material in which carbon, titanium, silver or the like is surface treated on the surface of aluminum or stainless steel, or the like. Specifically, a transition metal which adsorbs carbon well, such as copper and nickel, may be used as a current collector. The thickness of the current collector may be 6 μm to 20 μm, but is not limited thereto.

The binder may include at least one selected from the group consisting of polyvinylidenefluoride-hexafluoropropylene copolymer (PVDF-co-HFP), polyvinylidenefluoride, polyacrylonitrile, polymethylmethacrylate, polyvinylalcohol, carboxymethylcellulose (CMC), starch, hydroxypropylcellulose, regenerated cellulose, polyvinylpyrrolidone, tetrafluoroethylene, polyethylene, polypropylene, polyacrylic acid, an ethylene-propylene-diene monomer (EPDM), sulfonated EPDM, styrene butadiene rubber (SBR), fluorine rubber, poly acrylic acid, and a material in which the hydrogen thereof is substituted by Li, Na, Ca, etc., or may include various copolymers thereof.

The conductive material is not particularly limited as long as having electrical conductivity without causing a chemical change in the battery, and may use, for example, graphite such as natural graphite or artificial graphite; carbon black such as carbon black, acetylene black, ketjen black, channel black, panes black, lamp black or thermal black; a conductive fiber such as a carbon fiber or a metal fiber; a conductive tube such as a carbon nanotube; a metal powder such as fluorocarbon, aluminum or nickel powder; a conductive whisker such as zinc oxide and potassium titanate; a conductive metal oxide such as a titanium oxide; a conductive material such as a polyphenylene derivative; or the like.

A secondary battery according to still another embodiment of the present invention may include a negative electrode, a positive electrode, a separation membrane interposed between the positive electrode and the negative electrode, and an electrolyte, and the negative electrode is the same as the above-described negative electrode.

The positive electrode may include a positive electrode current collector and a positive electrode active material layer formed on the positive electrode current collector and including a positive electrode active material.

In the positive electrode, the positive electrode current collector is not particularly limited as long as having electrical conductivity without causing a chemical change in the battery, and may use, for example, stainless steel, aluminum, nickel, titanium, sintered carbon, a material in which aluminum, stainless steel, carbon, nickel, titanium, silver or the like is surface treated on the surface of aluminum or stainless steel. Further, the positive electrode current collector may have a thickness of 3 to 500 μm, and a fine unevenness may be formed on the surface of the current collector to increase the adhesive force of the positive electrode active material. For example, the positive electrode current collector may be used in various forms such as sheet, foil, net, porous body, foam, or nonwoven fabric.

The positive electrode active material may be a typically available positive electrode active material. Specifically, the positive electrode active material may include, but is not limited to, at least one selected from the group consisting of a layered compound such as lithium cobalt oxide ($LiCoO_2$), lithium nickel oxide ($LiNiO_2$), etc., and a compound substituted with one or more transition metals; a lithium iron oxide such as $LiFe_3O_4$; a lithium manganese oxide such as formula $Li_{1+c1}Mn_{2+c1}O_4$ ($0 \leq c1 \leq 0.33$), $LiMnO_3$, $LiMn_2O_3$, or $LiMnO_2$; a lithium copper oxide ($Li_2CuO_2$); a vanadium oxide such as $LiV_3O_8$, $V_2O_5$, or $Cu_2V_2O_7$; a Ni site-type lithium nickel oxide represented by a formula $LiNi_{1-c2}M_{c2}O_2$ (wherein M is at least any one selected from the group consisting of Co, Mn, Al, Cu, Fe, Mg, B and Ga, and satisfies $0.01 \leq c2 \leq 0.3$); a lithium-manganese composite oxide represented by a formula $LiMn_{2-c3}M_{c3}O_2$ (wherein M is at least any one selected from the group consisting of Co, Ni, Fe, Cr, Zn and Ta, and satisfies $0.01 \leq C3 \leq 0.1$) or $Li_2Mn_3MO_8$ (wherein M is Fe, Co, Ni, Cu, and Zn); or $LiMn_2O_4$ in which a part of Li in the formula is substituted with an alkaline earth metal ion. The positive electrode may be Li-metal.

The positive electrode active material layer may include a positive electrode conductive material and a positive electrode binder together with the above-described positive electrode active material.

In this case, the positive electrode conductive material is used for imparting electrical conductivity to the electrode, which may be used without any particular limitations as long as having electronic conductivity without causing a chemical change in the battery to be composed. Specific examples of the positive electrode conductive material may include graphite such as natural graphite or artificial graphite; a carbon-based material such as carbon black, acetylene black, ketjen black, channel black, furnace black, lamp black, summer black, or carbon fiber; metal powder or a metal fiber such as copper, nickel, aluminum, and silver; conductive material such as zinc oxide and potassium titanate; a conductive metal oxide such as titanium oxide; or a conductive polymer such as a polyphenylene derivative; or the like, and one kind thereof may be used alone or a mixture of two or more kinds thereof may be used.

In addition, the positive electrode binder may serve to improve attachment between the positive electrode active material particles and an adhesive force between the positive electrode active material and the positive electrode current collector. Specific examples of the positive electrode binder may include polyvinylidene fluoride (PVDF), vinylidene fluoride-hexafluoropropylene copolymer (PVDF-co-HFP), polyvinyl alcohol, polyacrylonitrile, carboxymethylcellulose (CMC), starch, hydroxypropyl cellulose, regenerated celluloses, polyvinylpyrrolidone, tetrafluoroethylene, polyethylene, polypropylene, ethylene-propylene-diene polymer (EPDM), sulfonation-EPDM, styrene butadiene rubber (SBR), fluorine rubber, or various copolymers thereof. Also, one kind thereof may be used alone or a mixture of two or more kinds thereof may be used.

The separation membrane separates the negative electrode from the positive electrode and may provide a moving path for lithium ions, which may be used without any particular limitations as long as being used as a separation membrane in a typical secondary battery. In particular, it is preferable that the separation membrane has a low resistance against the ion movement of the electrolyte and an excellent ability to impregnate the electrolytic solution. Specifically, examples of the separation membrane may include a porous polymer film, for example, a porous polymer film made of a polyolefin-based polymer such as ethylene homopolymer, propylene homopolymer, ethylene/butene copolymer, ethylene/hexene copolymer, and ethylene/methacrylate copolymer, or a laminated structure of two or more layers thereof may be used. Further, a typical porous nonwoven fabric, for example, a nonwoven fabric made of a glass fiber having a high melting point, a polyethylene terephthalate fiber or the like may be used. Also, a separation membrane may be used by being coated with a ceramic ingredient or a polymer material for increasing heat resistance or mechanical strength, and may be selectively used as a structure of a single layer or multiple layers.

The electrolyte may be, but is not limited to, an organic liquid electrolyte, an inorganic liquid electrolyte, a solid polymer electrolyte, a gelled polymer electrolyte, a solid inorganic electrolyte, and a molten inorganic electrolyte, which are usable for producing a lithium secondary battery.

Specifically, the electrolyte may include a non-aqueous organic solvent or a metal salt.

Examples of the non-aqueous organic solvent may include an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxyethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl pyrophosphate, ethyl propionate, or the like.

In particular, ethylene carbonate and propylene carbonate, which is cyclic carbonate in the carbonate-based organic solvent, are organic solvents having a high viscosity, which have a high dielectric constant to dissociate a lithium salt well, and thus may be preferably used. When such cyclic carbonate is used by mixing linear carbonate having a low viscosity and low dielectric constant, such as dimethyl carbonate and diethyl carbonate in an appropriate ratio, an electrolyte having a high electrical conductivity may be made, and thus may be more preferably used.

The metal salt may be a lithium salt, and the lithium salt is a material to be easily dissolved in the non-aqueous electrolytic solution. Examples of the anion of the lithium salt may include at least one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

For the purpose of improving the life characteristics of the battery, suppressing the reduction of the battery capacity, and improving the discharge capacity of the battery, in addition to the electrolyte ingredients, the electrolyte may further include, for example, at least one additive such as a haloalkylene carbonate-based compound such as difluoro ethylene carbonate or the like, pyridine, triethylphosphite, triethanolamine, cyclic ether, ethylene diamine, n-glyme, hexaphosphoric triamide, nitrobenzene derivatives, sulfur, quinone imine dyes, N-substituted oxazolidinones, N,N-substituted imidazolidine, ethylene glycol dialkyl ether, ammonium salt, pyrrole, 2-methoxyethanol, aluminum trichloride, or the like.

According to still another embodiment of the present invention, there are provided a battery module including the secondary battery as a unit cell and a battery pack including the same. The battery module and the battery pack include a secondary battery having a high capacity, a high rate-limiting characteristic and a cyclic characteristic, and thus may be used as a power source for a medium/large-sized device selected from the group consisting of an electric vehicle, a hybrid electric vehicle, a plug-in hybrid electric vehicle, and a power storage system.

Hereinafter, while preferred examples of the present invention will be described in order to facilitate understanding of the present invention, the above embodiments are merely illustrative of the present disclosure, and it will be apparent to those skilled in the art that various changes and modifications can be made within the scope and spirit of the present invention. It is also obvious that such variations and modifications fall within the scope of the appended claims.

EXAMPLE AND COMPARATIVE EXAMPLE

Example 1: Production of Battery (1) Production of Silicon-Based Active Material Particle 0.025 g of LiF and 0.5 g of sucrose were added to 30 g of isopropanol to produce a solution. Thereafter, 10 g of SiO (core, form of single particles) having an average particle diameter ($D_{50}$) of 5 μm was mixed in the solution. The mixture was then dried in a drying furnace at 120° C. for 2 hours. The dried mixture was pulverized again in a mortar and classified to form a sucrose-mixed silicon particle. The sucrose was carbonized by heat treatment at 800° C. under a nitrogen atmosphere to form a 2 nm thick carbon coating layer. The LiF was included in an amount of 12 wt % based on the total weight of the carbon coating layer.

(2) Production of Negative Electrode

A mixed negative electrode active material obtained by mixing graphite with the produced silicon-based active material particle at a weight ratio of 9:1, carbon black as a conductive material, carboxylmethyl cellulose (CMC) as a binder, and a styrene butadiene rubber (SBR) were mixed at a weight ratio of 95.8:1:1.7:1.5 to produce 5 g of a mixture. 28.9 g of distilled water was added to the mixture to produce a negative electrode slurry. The negative electrode slurry was applied on a copper (Cu) metal thin film which is a negative electrode current collector having a thickness of 20 μm, and dried. In this case, the temperature of air that was circulated was 60° C. Then, the negative electrode slurry was subjected to a roll press and dried in a vacuum oven for 12 hours at 130° C., and then was punched in a round shape of 1.4875 cm² to produce a negative electrode.

(3) Production of Secondary Battery

A lithium metal thin film obtained by cutting a positive electrode into a round shape of 1.7671 cm² was used as a positive electrode. A separation membrane of porous polyethylene was interposed between the positive electrode and the negative electrode, vinylene carbonate was dissolved in an amount of 0.5 wt % in the mixed solution in which methylethylcarbonate (EMC) and ethylenecarbonate (EC) were mixed at a volume ratio of 7:3, and an electrolytic solution in which 1 M concentration $LiPF_6$ was dissolved was added to produce a coin half-cell.

Example 2: Production of Battery (1) Production of Silicon-Based Active Material Particle 10 g of the negative electrode active material of Example 1 in which a carbon coating layer was formed and 0.8 g of Mg powder were mixed under an Ar atmosphere to prepare a mixed powder. The mixed powder was placed in a tube furnace and heated to 950° C. at a rate of 5° C./min under an Ar gas atmosphere, followed by heat treatment for 2 hours. Thereafter, the temperature of the furnace was lowered to room temperature, the heat-treated mixed powder was taken out and washed by being stirred for 1 hour in 1 M HCl. The washed mixed powder was washed with distilled water while being filtered, and then dried in an oven at 60° C. for 8 hours. In this way, a negative electrode active material including a core containing a metal compound at least one selected from the group consisting of MgO, $Mg_2SiO_4$, and $MgSiO_3$ was produced. From the results measured by XRD quantitative analysis, it was ascertained that the metal compound was included in an amount of 30 wt % in the core, based on the total weight of the core. The LiF was included in an amount of 12 wt %, based on the total weight of the carbon coating layer.

(2) Production of Negative Electrode and Secondary Battery

A negative electrode and a secondary battery were produced in the same manner as in Example 1 by using the silicon-based active material particle.

Example 3: Production of Battery (1) Production of Silicon-Based Active Material Particle 10 g of the negative electrode active material of Example 1 in which the carbon coating layer was formed and 0.8 g of Li powder were mixed under an Ar atmosphere to prepare a mixed powder. The mixed powder was placed in a tube furnace and heated to 950° C. at a rate of 5° C./min under an Ar gas atmosphere, followed by heat treatment for 2 hours. Thereafter, the temperature of the furnace was lowered to room temperature, and the heat-treated mixed powder was taken out. In this way, a negative electrode active material including a core containing a metal compound of $Li_2SiO_3$, $Li_4SiO_4$, $Li_2Si_2O_5$ was produced. From the results measured by XRD quantitative analysis, it was ascertained that the metal compound was included in an amount of 40 wt % in the core, based on the total weight of the core. The LiF was included in an amount of 12 wt %, based on the total weight of the carbon coating layer.

(2) Production of Negative Electrode and Secondary Battery

A negative electrode and a secondary battery were produced in the same manner as in Example 1 by using the silicon-based active material particle.

Example 4: Production of Battery (1) Production of Silicon-Based Active Material Particle 0.025 g of LiF and 0.5 g of sucrose were added to 30 g of isopropanol to produce a solution. Thereafter, 10 g of SiO (core, form of single particles) having an average particle diameter ($D_{50}$) of 1 μm was mixed in the solution. Then, the mixture was dried in a drying furnace at 120° C. for 2 hours. The dried mixture was pulverized again in a mortar and classified to form a sucrose-mixed silicon particle. The sucrose was carbonized by heat treatment at 800° C. under a nitrogen atmosphere to form a 2 nm thick carbon coating layer, and thus a primary particle was produced. The LiF was included in an amount of 12 wt %, based on the total weight of the carbon coating layer.

A solution in which the primary particle and ethanol/water (volume ratio=1:9) were included at a volume ratio of 1:10 was stirred with a mechanical homogenizer at a rate of 10,000 rpm for 30 minutes to produce a dispersion solution for spray drying. The dispersion solution was spray-dried by a mini-spray dryer (manufactured by Batch Co., Ltd., model: B-290 Mini Spray-Dryer) with the conditions of an inlet temperature of 180° C., an aspirator of 95% and a feeding rate of 12 to produce a preliminary secondary particle, which was then transferred to an alumina boat. After the temperature of a tube furnace equipped with a quartz tube having an 80 cm length and a 4.8 cm inner diameter was heated to 600° C. at a rate of 10° C./min, the preliminary secondary particle was sintered while maintaining the temperature for 2 hours, thereby producing a secondary particle. The porosity of the produced secondary particle was 1%, and the average particle diameter ($D_{50}$) thereof was 5 μm. The porosity was measured by a mercury porosimeter method.

(2) Production of Negative Electrode and Secondary Battery

A negative electrode and a secondary battery were produced in the same manner as in Example 1 by using the silicon-based active material particle.

Example 5: Production of Battery (1) Production of Silicon-Based Active Material Particle 0.025 g of LiF and 0.5 g of sucrose were added to 30 g of isopropanol to produce a solution. Thereafter, 10 g of SiO (core, form of single particles) having an average particle diameter ($D_{50}$) of 1 μm was mixed in the solution. Then, the mixture was dried in a drying furnace at 120° C. for 2 hours. The dried mixture was pulverized again in a mortar and classified to form a sucrose-mixed silicon particle. The sucrose was carbonized by heat treatment at 800° C. under a nitrogen atmosphere to form a 2 nm thick carbon coating layer, and thus a preliminary primary particle was produced. The LiF was included in an amount of 12 wt %, based on the total weight of the carbon coating layer.

10 g of the preliminary primary particle in which a carbon coating layer was formed and 0.8 g of Mg powder were mixed under an Ar atmosphere to prepare a mixed powder. The mixed powder was placed in a tube furnace, and heated to 950° C. at a rate of 5° C./min under an Ar gas atmosphere, followed by heat treatment for 2 hours. Thereafter, the temperature of the furnace was lowered to room temperature, and the mixed powder was taken out and washed by being stirred for 1 hour in 1 M HCl. The washed mixed powder was washed with distilled water while being filtered, and then dried in an oven at 60° C. for 8 hours. In this way, a primary particle including the core containing a metal compound of MgO, $Mg_2SiO_4$, and $MgSiO_3$ was produced. From the results measured by XRD quantitative analysis, the metal compound was included in an amount of 30 wt % in the core, based on the total weight of the core.

A solution in which the primary particle and ethanol/water (volume ratio=1:9) were included at a volume ratio of 1:10 was stirred with a mechanical homogenizer at a rate of 10,000 rpm for 30 minutes to produce a dispersion solution for spray drying. The dispersion solution was spray-dried by a mini-spray dryer (manufactured by Batch Co., Ltd., model: B-290 Mini Spray-Dryer) with an inlet temperature of 180° C., an aspirator of 95% and a feeding rate of 12, and thus a preliminary secondary particle was produced, which was then transferred to an alumina boat. After the temperature of a tube furnace equipped with a quartz tube having an 80 cm length and a 4.8 cm inner diameter was heated to 600° C. at a rate of 10° C./min, the preliminary secondary particle was sintered while maintaining the temperature for 2 hours, thereby producing a secondary particle. The porosity of the produced secondary particle was 1%, and the average particle diameter ($D_{50}$) thereof was 5 μm. The porosity was measured by a mercury porosimeter method.

(2) Production of Negative Electrode and Secondary Battery

A negative electrode and a secondary battery were produced in the same manner as in Example 1 by using the silicon-based active material particle.

Example 6: Production of Battery (1) Production of Silicon-Based Active Material Particle 0.025 g of LiF and 0.5 g of sucrose were added to 30 g of isopropanol to produce a solution. Thereafter, 10 g of SiO (core, form of single particles) having an average particle diameter ($D_{50}$) of 1 μm was mixed in the solution. Then, the mixture was dried in a drying furnace at 120° C. for 2 hours. The dried mixture was pulverized again in a mortar and classified to form a sucrose-mixed silicon particle. The sucrose was carbonized by heat treatment at 800° C. under a nitrogen atmosphere to form a 2 nm thick carbon coating layer, and thus a preliminary primary particle was produced. The LiF was included in an amount of 12 wt %, based on the total weight of the carbon coating layer.

10 g of the preliminary primary particle in which a carbon coating layer was formed and 0.8 g of Li powder were mixed under an Ar atmosphere to prepare a mixed powder. The mixed powder was placed in a tube furnace, and heated to 950° C. at a rate of 5° C./min under an Ar gas atmosphere, followed by heat treatment for 2 hours. Thereafter, the temperature of the furnace was lowered to room temperature, and the mixed powder was taken out. In this way, a primary particle including the core containing a metal compound of $Li_2SiO_3$, $Li_4SiO_4$, and $Li_2Si_2O_5$ was produced. From the results measured by XRD quantitative analysis, the metal compound was included in an amount of 40 wt % in the core, based on the total weight of the core.

A solution in which the primary particle and ethanol/water (volume ratio=1:9) were included at a volume ratio of 1:10 was stirred with a mechanical homogenizer at a rate of 10,000 rpm for 30 minutes to produce a dispersion solution for spray drying. The dispersion solution was spray-dried by a mini-spray dryer (manufactured by Batch Co., Ltd., model: B-290 Mini Spray-Dryer) of an inlet temperature of 180° C., an aspirator of 95% and a feeding rate of 12, and thus a preliminary secondary particle was produced, which was then transferred to an alumina boat. After the temperature of a tube furnace equipped with a quartz tube having an 80 cm length and a 4.8 cm inner diameter was heated to 600° C. at a rate of 10° C./min, and then the preliminary secondary particle was sintered while maintaining the temperature for 2 hours, thereby producing a secondary particle. The porosity of the produced secondary particle was 1%, and the average particle diameter ($D_{50}$) thereof was 5 μm. The porosity was measured by a mercury porosimeter method.

(2) Production of Negative Electrode and Secondary Battery

A negative electrode and a secondary battery were produced in the same manner as in Example 1 by using the silicon-based active material particle.

Example 7: Production of Battery (1) Production of Silicon-Based Active Material Particle 0.025 g of LiF and 0.5 g of polyaniline was added to 30 g of isopropanol to produce a solution. Thereafter, 10 g of SiO (core, form of single particles) having an average particle diameter ($D_{50}$) of 5 μm was mixed in the solution and stirred for 2 hours. Then, the mixture was dried in a drying furnace at 120° C. for 2 hours. The dried mixture was pulverized again in a mortar and classified to produce a negative electrode active material in which a polymer coating layer including LiF and polyaniline was formed on SiO. The LiF was included in an amount of 5 wt %, based on the total weight of the polymer coating layer.

(2) Production of Negative Electrode and Secondary Battery

A negative electrode and a secondary battery were produced in the same manner as in Example 1, except that the silicon-based active material particle was used.

Example 8: Production of Battery (1) Production of Silicon-Based Active Material Particle 0.025 g of LiF and 0.5 g of polyaniline was added to 30 g of isopropanol to produce a solution. Thereafter, 10 g of SiO (core, form of single particles) having an average particle diameter ($D_{50}$) of 1 μm was mixed in the solution and stirred for 2 hours. Then, the mixture was dried in a drying furnace at 120° C. for 2 hours. The dried mixture was pulverized again in a mortar and classified to produce a primary particle in which a polymer coating layer including LiF and polyaniline was formed on SiO. The LiF was included in an amount of 5 wt %, based on the total weight of the polymer coating layer.

A solution in which the primary particle and ethanol/water (volume ratio=1:9) were included at a volume ratio of 1:10 was stirred with a mechanical homogenizer at a rate of 10,000 rpm for 30 minutes to produce a dispersion solution for spray drying. The dispersion solution was spray-dried by a mini-spray dryer (manufactured by Batch Co., Ltd., model: B-290 Mini Spray-Dryer) with an inlet temperature of 180° C., an aspirator of 95% and a feeding rate of 12, and thus a preliminary secondary particle was produced, which was then transferred to an alumina boat. After the temperature of a tube furnace equipped with a quartz tube having an 80 cm length and a 4.8 cm inner diameter was heated to 600° C. at a rate of 10° C./min, the preliminary secondary particle was sintered while maintaining the temperature for 2 hours, thereby producing a secondary particle. The porosity of the produced secondary particle was 1%, and the average particle diameter ($D_{50}$) thereof was 5 μm. The porosity was measured by a mercury porosimeter method.

(2) Production of Negative Electrode and Secondary Battery

A negative electrode and a secondary battery were produced in the same manner as in Example 1, except that the silicon-based active material particle was used.

Comparative Example 1: Production of Battery (1) Production of Negative Electrode Active Material 0.5 g of sucrose was added to 30 g of isopropanol to produce a solution. Thereafter, 10 g of SiO (form of single particles) having an average particle diameter ($D_{50}$) of 5 μm was mixed in the solution. Then, the mixture was dried in a drying furnace at 120° C. for 2 hours. The dried mixture was pulverized again in a mortar and classified to form a sucrose-mixed silicon particle. The sucrose was carbonized by heat treatment at 800° C. under a nitrogen atmosphere to form a 2 nm thick carbon coating layer.

(2) Production of Negative Electrode and Secondary Battery

A negative electrode and a secondary battery were produced in the same manner as in Example 1.

Comparative Example 2: Production of Battery (1) Production of Negative Electrode Active Material 10 g of the particle of Comparative Example 1 in which a carbon coating layer was formed and 0.8 g of Mg powder were mixed under an Ar atmosphere to prepare a mixed powder. The mixed powder was placed in a tube furnace, and heated to 950° C. at a rate of 5° C./min under an Ar gas atmosphere, followed by heat treatment for 2 hours. Thereafter, the temperature of the furnace was lowered to room temperature, and the heat-treated mixed powder was taken out and washed by being stirred for 1 hour in 1 M HCl. The washed mixed powder was washed with distilled water while being filtered, and then dried in an oven at 60° C. for 8 hours. In this way, a negative electrode active material including a core including a metal compound containing MgO, $Mg_2SiO_4$, and $MgSiO_3$ was produced. From the results measured by XRD quantitative analysis, it was ascertained that the metal compound was included in an amount of 30 wt % in the core, based on the total weight of the core.

(2) Production of Negative Electrode and Secondary Battery

A negative electrode and a secondary battery were produced in the same manner as in Example 1 by using the negative electrode active material.

Comparative Example 3: Production of Battery (1) Production of Negative Electrode Active Material 10 g of the particle of Comparative Example 1 in which a carbon coating layer was formed and 0.8 g of Li powder were mixed under an Ar atmosphere to prepare a mixed powder. The mixed powder was placed in a tube furnace, and heated to 950° C. at a rate of 5° C./min under an Ar gas atmosphere, followed by heat treatment for 2 hours. Thereafter, the temperature of the furnace was lowered to room temperature, and the heat-treated mixed powder was taken out. In this way, a negative electrode active material including a core including a metal compound of $Li_2SiO_3$, $Li_4SiO_4$, and $Li_2Si_2O_5$ was produced. From the results measured by XRD quantitative analysis, it was ascertained that the metal compound was included in an amount of 40 wt %, based on the total weight of the core.

(2) Production of Negative Electrode and Secondary Battery

A negative electrode and a secondary battery were produced in the same manner as in Example 1 by using the negative electrode active material.

Comparative Example 4: Production of Battery (1) Production of Negative Electrode Active Material 0.5 g of sucrose were added to 30 g of isopropanol to produce a solution. Thereafter, 10 g of SiO (core, form of single particles) having an average particle diameter ($D_{50}$) of 1 μm was mixed in the solution. Then, the mixture was dried in a drying furnace at 120° C. for 2 hours. The dried mixture was pulverized again in a mortar and classified to form a sucrose-mixed silicon particle. The sucrose was carbonized by heat treatment at 800° C. under a nitrogen atmosphere to form a 2 nm thick carbon coating layer, and thus a primary particle was produced.

A solution in which the primary particle and ethanol/water (volume ratio=1:9) were included at a volume ratio of 1:10 was stirred with a mechanical homogenizer at a rate of 10,000 rpm for 30 minutes to produce a dispersion solution for spray drying. The dispersion solution was spray-dried by a mini-spray dryer (manufactured by Batch Co., Ltd., model: B-290 Mini Spray-Dryer) with an inlet temperature of 180° C., an aspirator of 95% and a feeding rate of 12, and thus a preliminary secondary particle was produced, which was then transferred to an alumina boat. After the temperature of a tube furnace equipped with a quartz tube having an 80 cm length and a 4.8 cm inner diameter was heated to 600° C. at a rate of 10° C./min, the preliminary secondary particle was sintered while maintaining the temperature for 2 hours, thereby producing a secondary particle. The porosity of the produced secondary particle was 1%, and the average particle diameter ($D_{50}$) thereof was 5 µm. The porosity was measured by a mercury porosimeter method.

(2) Production of Negative Electrode and Secondary Battery

A negative electrode and a secondary battery were produced in the same manner as in Comparative Example 1 by using the negative electrode active material.

Comparative Example 5: Production of Battery (1) Production of Negative Electrode Active Material 0.5 g of sucrose were added to 30 g of isopropanol to produce a solution. Thereafter, 10 g of SiO (core, form of single particles) having an average particle diameter ($D_{50}$) of 1 µm was mixed in the solution. Then, the mixture was dried in a drying furnace at 120° C. for 2 hours. The dried mixture was pulverized again in a mortar and classified to form a sucrose-mixed silicon particle. The sucrose was carbonized by heat treatment at 800° C. under a nitrogen atmosphere to form a 2 nm thick carbon coating layer, and a preliminary primary particle was thus produced.

10 g of the preliminary primary particle in which a carbon coating layer was formed and 0.8 g of Mg powder were mixed under an Ar atmosphere to prepare a mixed powder. The mixed powder was placed in a tube furnace, and heated to 950° C. at a rate of 5° C./rain under an Ar gas atmosphere, followed by heat treatment for 2 hours. Thereafter, the temperature of the furnace was lowered to room temperature, and the heat-treated mixed powder was taken out, and washed by being stirred for 1 hour in 1 M HCl. The washed mixed powder was washed while being filtered, and then dried in an oven at 60° C. for 8 hours. In this way, a primary particle including a core containing a metal compound of MgO, $Mg_2SiO_4$, and $MgSiO_3$ was produced. From the results measured by XRD quantitative analysis, it was ascertained that the metal compound was included in an amount of 30 wt %, based on the total weight of the core.

A solution in which the primary particle and ethanol/water (volume ratio=1:9) were included at a volume ratio of 1:10 was stirred with a mechanical homogenizer at a rate of 10,000 rpm for 30 minutes to produce a dispersion solution for spray drying. The dispersion solution was spray-dried by a mini-spray dryer (manufactured by Batch Co., Ltd., model: B-290 Mini Spray-Dryer) with an inlet temperature of 180° C., an aspirator of 95% and a feeding rate of 12, and thus a preliminary secondary particle was produced, which was then transferred to an alumina boat. After the temperature of a tube furnace equipped with a quartz tube having an 80 cm length and a 4.8 cm inner diameter was heated to 600° C. at a rate of 10° C./min, the preliminary secondary particle was sintered while maintaining the temperature for 2 hours, thereby producing a secondary particle. The porosity of the produced secondary particle was 1%, and the average particle diameter ($D_{50}$) thereof was 5 µm. The porosity was measured by a mercury porosimeter method.

(2) Production of Negative Electrode and Secondary Battery

A negative electrode and a secondary battery were produced in the same manner as in Comparative Example 1 by using the negative electrode active material.

Comparative Example 6: Production of Battery (1) Production of Negative Electrode Active Material 0.5 g of sucrose were added to 30 g of isopropanol to produce a solution. Thereafter, 10 g of SiO (core, form of single particles) having an average particle diameter ($D_{50}$) of 1 µm was mixed in the solution. Then, the mixture was dried in a drying furnace at 120° C. for 2 hours. The dried mixture was pulverized again in a mortar and classified to form a sucrose-mixed silicon particle. The sucrose was carbonized by heat treatment at 800° C. under a nitrogen atmosphere to form a 2 nm thick carbon coating layer, and thus a preliminary primary particle was produced.

10 g of the preliminary primary particle in which a carbon coating layer was formed and 0.8 g of Li powder were mixed under an Ar atmosphere to prepare a mixed powder. The mixed powder was placed in a tube furnace, and heated to 950° C. at a rate of 5° C./min under an Ar gas atmosphere, followed by heat treatment for 2 hours. Thereafter, the temperature of the furnace was lowered to room temperature, and the heat-treated mixed powder was taken out. In this way, a primary particle including a core containing a metal compound of $Li_2SiO_3$, $Li_4SiO_4$, and $Li_2Si_2O_5$ was produced. From the results measured by XRD quantitative analysis, it was ascertained that the metal compound was included in an amount of 40 wt %, based on the total weight of the core.

A solution in which the primary particle and ethanol/water (volume ratio=1:9) were included at a volume ratio of 1:10 was stirred with a mechanical homogenizer at a rate of 10,000 rpm for 30 minutes to produce a dispersion solution for spray drying. The dispersion solution was spray-dried by a mini-spray dryer (manufactured by Batch Co., Ltd., model: B-290 Mini Spray-Dryer) with an inlet temperature of 180° C., an aspirator of 95% and a feeding rate of 12, and thus a preliminary secondary particle was produced, which was then transferred to an alumina boat. After the temperature of a tube furnace equipped with a quartz tube having an 80 cm length and a 4.8 cm inner diameter was heated to 600° C. at a rate of 10° C./min, the preliminary secondary particle was sintered while maintaining the temperature for 2 hours, thereby producing a secondary particle. The porosity of the produced secondary particle was 1%, and the average particle diameter ($D_{50}$) thereof was 5 µm. The porosity was measured by a mercury porosimeter method.

(2) Production of Negative Electrode and Secondary Battery

A negative electrode and a secondary battery were produced in the same manner as in Comparative Example 1 by using the negative electrode active material.

Comparative Example 7: Production of Battery

(1) Production of Negative Electrode Active Material 0.5 g of polyaniline were added to 30 g of isopropanol to produce a solution. Thereafter, 10 g of SiO (form of single particles) having an average particle diameter ($D_{50}$) of 5 μm was mixed in the solution and stirred for 2 hours. Then, the mixture was dried in a drying furnace at 120° C. for 2 hours. The dried mixture was pulverized again in a mortar and classified to produce a SiO particle coated with polyaniline.

(2) Production of Negative Electrode and Secondary Battery

A negative electrode and a secondary battery were produced in the same manner as in Comparative Example 1, except that the negative electrode active material was used.

Comparative Example 8: Production of Battery

(1) Production of Negative Electrode Active Material 0.5 g of polyaniline were added to 30 g of isopropanol to produce a solution. Thereafter, 10 a of SiO (core, form of single particles) having an average particle diameter ($D_{50}$) of 1 μm was mixed in the solution and stirred for 2 hours. Then, the mixture was dried in a drying furnace at 120° C. for 2 hours. The dried mixture was pulverized again in a mortar and classified to produce a primary particle in which a polymer coating layer including polyaniline was formed on SiO.

A solution in which the primary particle and ethanol/water (volume ratio=1:9) were included at a volume ratio of 1:10 was stirred with a mechanical homogenizer at a rate of 10,000 rpm for 30 minutes to produce a dispersion solution for spray drying. The dispersion solution was spray-dried by a mini-spray dryer (manufactured by Batch Co., Ltd., model: B-290 Mini Spray-Dryer) with an inlet temperature of 180° C., an aspirator of 95% and a feeding rate of 12, and thus a preliminary secondary particle was produced, which was then transferred to an alumina boat. After the temperature of a tube furnace equipped with a quartz tube having an 80 cm length and a 4.8 cm inner diameter was heated to 600° C. at a rate of 10° C./min, the preliminary secondary particle was sintered while maintaining the temperature for 2 hours, thereby producing a secondary particle. The porosity of the produced secondary particle was 1%, and the average particle diameter ($D_{50}$) thereof was 5 μm. The porosity was measured by a mercury porosimeter method.

(2) Production of Negative Electrode and Secondary Battery

A negative electrode and a secondary battery were produced in the same manner as in Comparative Example 1, except that the negative electrode active material was used.

Experimental Example 1: Evaluation of Charge Rate Characteristics

The charge rate characteristics were evaluated for the batteries in Examples 1 to 8 and Comparative Examples 1 to 8, and the results thereof are shown in Table 1 below.

Specifically, for each of the batteries in Examples 1 to 8 and Comparative Examples 1 to 8, it was ascertained how much the length of constant current (CC) mode decreased during charging while fixing a discharge rate to 0.2 C and changing a charge rate into 0.2 C, 1.0 C, 2.0 C and 3.0 C.

TABLE 1

| Battery | 0.2 C (%) | 1.0 C (%) | 2.0 C (%) | 3.0 C (%) |
| --- | --- | --- | --- | --- |
| Example 1 (SiO + LiF-containing carbon coating layer) | 84.19 | 69.94 | 36.32 | 6.07 |
| Example 2 (Mg-doped SiO + LiF-containing carbon coating layer) | 84.59 | 69.96 | 36.63 | 6.12 |
| Example 3 (Li-doped SiO + LiF-containing carbon coating layer) | 85.15 | 70.05 | 36.99 | 6.23 |
| Example 4 (SiO of secondary particle + LiF-containing carbon coating layer) | 85.80 | 72.05 | 37.85 | 8.04 |
| Example 5 (SiO of Mg-doped secondary particle + LiF-containing carbon coating layer) | 85.93 | 72.34 | 37.90 | 8.13 |
| Example 6 (SiO of Li-doped secondary particle + LiF-containing carbon coating layer) | 86.00 | 72.57 | 37.92 | 8.14 |
| Example 7 (SiO + LiF-containing polymer coating layer) | 80.01 | 62.34 | 25.36 | 5.82 |
| Example 8 (SiO of secondary particle + LiF-containing polymer coating layer) | 81.02 | 63.73 | 26.78 | 6.89 |
| Comparative Example 1 (SiO + LiF-free carbon coating layer) | 77.37 | 53.05 | 18.07 | 2.94 |
| Comparative Example 2 (Mg-doped SiO + LiF-free carbon coating layer) | 77.71 | 51.67 | 15.99 | 2.83 |
| Comparative Example 3 (Li-doped SiO + LiF-free carbon coating layer) | 77.82 | 54.33 | 18.69 | 2.94 |
| Comparative Example 4 (SiO of secondary particle + LiF-free carbon coating layer) | 78.65 | 54.71 | 19.82 | 3.12 |
| Comparative Example 5 (SiO of Mg-doped secondary particle + LiF-free carbon coating layer) | 78.66 | 55.01 | 20.41 | 3.25 |
| Comparative Example 6 (SiO of Li-doped secondary particle + LiF-free carbon coating layer) | 79.55 | 56.78 | 21.44 | 3.58 |
| Comparative Example 7 (SiO + LiF-free polymer coating layer) | 64.34 | 38.22 | 13.45 | 2.01 |
| Comparative Example 8 (SiO of secondary particle + LiF-free polymer coating layer) | 65.07 | 39.08 | 14.81 | 3.06 |

Referring to Table 1, in the case of Examples in which the coating layer (carbon coating layer or polymer coating layer) includes LiF, the lengths of CC mode were all longer than those of Comparative Examples in which the coating layer does not include LiF in the same conditions. That is, it may be seen that the electrode resistance becomes small during charging and thus the charge becomes easier.

Experiment Example 2: Evaluation of Discharge Rate Characteristics

The discharge rate characteristics were evaluated for the batteries in Examples 1 to 8 and Comparative Examples 1 to 8, and the results thereof are shown in Table 2 below.

Specifically, for each of the batteries in Examples 1 to 8 and Comparative Examples 1 to 8, it was ascertained that the discharge capacity (%) decreased while fixing a charge rate to 0.2 C and changing a discharge rate into 0.2 C, 1.0 C, 3.0 C and 5.0 C. Meanwhile, the discharge capacity at a discharge rate of 0.2 C was set to 100%.

TABLE 2

| Battery | 0.2 C (%) | 1.0 C (%) | 3.0 C (%) | 5.0 C (%) |
|---|---|---|---|---|
| Example 1 (SiO + LiF-containing carbon coating layer) | 100 | 97.52 | 86.77 | 76.37 |
| Example 2 (Mg-doped SiO + LiF-containing carbon coating layer) | 100 | 97.56 | 86.81 | 76.48 |
| Example 3 (Li-doped SiO + LiF-containing carbon coating layer) | 100 | 97.60 | 87.14 | 76.83 |
| Example 4 (SiO of secondary particle + LiF-containing carbon coating layer) | 100 | 99.01 | 94.25 | 83.58 |
| Example 5 (SiO of Mg-doped secondary particle + LiF-containing carbon coating layer) | 100 | 99.02 | 94.27 | 83.65 |
| Example 6 (SiO of Li-doped secondary particle + LiF-containing carbon coating layer) | 100 | 99.01 | 94.31 | 84.00 |
| Example 7 (SiO + LiF-containing polymer coating layer) | 100 | 95.34 | 81.70 | 68.43 |
| Example 8 (SiO of secondary particle + LiF-containing polymer coating layer) | 100 | 96.01 | 82.78 | 69.34 |
| Comparative Example 1 (SiO + LiF-free carbon coating layer) | 100 | 95.09 | 82.74 | 72.53 |
| Comparative Example 2 (Mg-doped SiO + LiF-free carbon coating layer) | 100 | 95.13 | 82.82 | 72.56 |
| Comparative Example 3 (Li-doped SiO + LiF-free carbon coating layer) | 100 | 95.20 | 83.00 | 72.57 |
| Comparative Example 4 (SiO of secondary particle + LiF-free carbon coating layer) | 100 | 96.23 | 84.55 | 75.26 |
| Comparative Example 5 (SiO of Mg-doped secondary particle + LiF-free carbon coating layer) | 100 | 96.26 | 84.59 | 75.30 |
| Comparative Example 6 (SiO of Li-doped secondary particle + LiF-free carbon coating layer) | 100 | 96.35 | 84.62 | 75.32 |
| Comparative Example 7 (SiO + LiF-free polymer coating layer) | 100 | 85.36 | 71.83 | 59.26 |
| Comparative Example 8 (SiO of secondary particle + LiF-free polymer coating layer) | 100 | 86.79 | 74.22 | 62.66 |

Referring to Table 2, in the case of Examples in which the coating layer (carbon coating layer or polymer coating layer) included LiF, the decreasing rates of discharge capacity were all slower than those of Comparative Examples in which the coating layer did not include LiF in the same conditions. That is, in the case of Examples, it may be seen that the electrode resistance becomes small and thus the discharge capacity decreases more slowly.

The invention claimed is:

1. A negative electrode active material comprising:
  silicon-based active material particles comprising a core comprising $SiO_x$, wherein $0 \leq x < 2$, and a coating layer present on the core,
  wherein the coating layer comprises (a) carbon or a polymer, and (b) a fluorinated material,
  wherein the fluorinated material is present in an amount of 0.1 wt % to 20 wt %, based on a total weight of the coating layer, and
  wherein the fluorinated material is LiF.

2. The negative electrode active material of claim 1, wherein at least a part of the fluorinated material is spaced apart from the core.

3. The negative electrode active material of claim 1, wherein the silicon-based active material particles are in the form of single particles, and
  an average particle diameter (D50) of the silicon-based active material particles in the form of single particles is 0.1 μm to 50 μm.

4. The negative electrode active material of claim 1, wherein the silicon-based active material particles are in the form of primary particles agglomerated with each other to form secondary particles.

5. The negative electrode active material of claim 4, wherein an average particle diameter (D50) of the silicon-based active material particles which are in the form of primary particles is 0.5 μm to 20 μm.

6. The negative electrode active material of claim 1, wherein the core further comprises a metal compound,
  wherein the metal compound comprises at least one selected from the group consisting of a metal oxide and a metal silicate.

7. The negative electrode active material of claim 6, wherein the metal compound comprises the metal oxide, wherein the metal oxide comprises an oxide of at least one metal selected from the group consisting of Li, Mg, Al, Ca and Ti.

8. The negative electrode active material of claim 6, wherein the metal compound comprises the metal silicate, wherein the metal silicate comprises a silicate of at least one metal selected from the group consisting of Li, Mg, Al, Ca and Ti.

9. The negative electrode active material of claim 6, wherein the metal compound comprises the metal oxide, wherein the metal compound is present in an amount of 1 wt % to 60 wt %, based on a total weight of the core.

10. The negative electrode active material of claim 1, wherein the silicon-based active material particles are in the form of primary particles agglomerated with each other to form secondary particles,
  wherein the core further comprises a metal compound,
  wherein the metal compound comprises at least one selected from the group consisting of a metal oxide and a metal silicate.

11. The negative electrode active material of claim 1, wherein the coating layer is present in an amount of 0.1 wt % to 50 wt %, based on a total weight of the silicon-based active material particle.

12. The negative electrode active material of claim 1, wherein the coating layer is the carbon coating layer, wherein the carbon coating layer comprises at least one selected from the group consisting of an amorphous carbon and a crystalline carbon.

13. The negative electrode active material of claim 1, further comprising carbon-based active material particles.

14. A negative electrode comprising the negative electrode active material of claim 1.

15. A secondary battery comprising:
the negative electrode of claim 14;
a positive electrode;
a separation membrane interposed between the positive electrode and the negative electrode; and
an electrolyte.

16. The negative electrode active material of claim 12, wherein the amorphous carbon is a carbonized material carbide of an organic material selected from the group consisting of sucrose, glucose, galactose, fructose, lactose, mannose, ribose, aldohexose or ketohexose carbides and a combination thereof.

17. A negative electrode active material comprising:
silicon-based active material particles comprising a core comprising $SiO_x$ and a metal compound, wherein $0 \leq x < 2$, and a coating layer present on the core,
wherein the coating layer comprises (a) carbon or a polymer, and (b) a fluorinated material,
wherein the metal compound comprises a metal silicate comprising a silicate of at least one metal selected from the group consisting of Mg, Al, Ca and Ti,
wherein the fluorinated material is present in an amount of 0.1 wt % to 20 wt %, based on a total weight of the coating layer, and
wherein the fluorinated material is LiF.

* * * * *